(12) United States Patent
Hahn et al.

(10) Patent No.: US 7,752,463 B2
(45) Date of Patent: Jul. 6, 2010

(54) AUTOMATICALLY FILLING A DRIVE TABLE

(75) Inventors: Timothy James Hahn, Cary, NC (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 11/530,013

(22) Filed: Sep. 7, 2006

(65) Prior Publication Data

US 2008/0066193 A1 Mar. 13, 2008

(51) Int. Cl.
G06F 21/00 (2006.01)
H04L 9/14 (2006.01)
(52) U.S. Cl. ................. 713/193; 380/277; 711/100
(58) Field of Classification Search ............. 726/27–33; 713/193; 380/277
See application file for complete search history.

(56) References Cited

U.S. PATENT DOCUMENTS

| | | | |
|---|---|---|---|
| 6,023,643 A | 2/2000 | Jesionowski | |
| 6,295,361 B1 | 9/2001 | Kadansky et al. | |
| 6,493,825 B1 * | 12/2002 | Blumenau et al. | 713/168 |
| 6,567,914 B1 | 5/2003 | Just et al. | |
| 6,915,434 B1 | 7/2005 | Kuroda et al. | |
| 6,918,040 B2 | 7/2005 | Ries et al. | |
| 6,950,522 B1 | 9/2005 | Mitchell et al. | |
| 7,013,389 B1 | 3/2006 | Srivastava et al. | |
| 2002/0164035 A1 | 11/2002 | Yokota et al. | |
| 2003/0081787 A1 | 5/2003 | Kallahalla et al. | |
| 2003/0099362 A1 | 5/2003 | Rollins | |
| 2003/0159058 A1 * | 8/2003 | Eguchi et al. | 713/193 |
| 2005/0071591 A1 | 3/2005 | Goodman et al. | |
| 2005/0086471 A1 | 4/2005 | Spencer | |
| 2005/0204161 A1 | 9/2005 | Caronni | |
| 2005/0207570 A1 | 9/2005 | Yamamoto et al. | |
| 2005/0226423 A1 | 10/2005 | Li et al. | |
| 2006/0048039 A1 * | 3/2006 | Barrett et al. | 714/799 |
| 2006/0062383 A1 | 3/2006 | Kaneda et al. | |
| 2006/0156035 A1 * | 7/2006 | Tran et al. | 713/193 |
| 2006/0253703 A1 * | 11/2006 | Eronen et al. | 713/156 |

OTHER PUBLICATIONS

U.S. Patent Applicaton entitled "Selective Encryption of Data Stored on Removable Media in an Automated Data Storage Library", U.S. Appl. No. 11/470,670, filed Sep. 7, 2006, IBM , by inventors B. G. Goodman, J.A. Fisher, andL.G. Jesionowski.

(Continued)

Primary Examiner—Gilberto Barron, Jr.
Assistant Examiner—David Le
(74) Attorney, Agent, or Firm—Janaki K. Davda; Konrad Raynes & Victor LLP

(57) ABSTRACT

Provided are techniques for filling a drive table. A key request including at least one of a drive serial number and a world wide node name is received from a data storage drive. It is determined whether the drive serial number or a world wide node name are in an entry in a drive table. In response to determining that the drive serial number or a world wide node name are not in an entry in a drive table, a new entry is automatically added in the drive table that includes the at least one of a drive serial number and a world wide node name.

22 Claims, 5 Drawing Sheets

OTHER PUBLICATIONS

"Advanced Encryption Standard (AES)", Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, IBM, by inventors B.G. Goodman, G.A. Jaquette, L.G. Jesionowski and P.M. Greco.

U.S. Patent Application entitled "Keyless Encrypted Data", U.S. Appl. No. 11/530,008, filed Sep. 7, 2006, IBM, by inventors P.M. Greco and G.A. Jaquette.

U.S. Patent Application entitled "Key Generation and Retrieval Using Key Servers", U.S. Appl. No. 11/530,006, filed Sep. 7, 2006, IBM, by inventors P.M. Greco, .TJ. Hahn and G.A. Jaquette.

U.S. Patent Application entitled "Maintaining Encryption Key Integrity", U.S. Appl. No. 11/530,012, filed Sep. 7, 2006, IBM, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, IBM, by inventors P.M. Greco, G.A. Jaquette, and W.E. Rhoten.

U.S. Patent Application entitled "Detection and Handling of Encryption Key and Initialization Vector", U.S. Appl. No. 11/530,010, filed Sep. 7, 2006, IBM, by inventors P.M. Greco, M.J. Sandberg and S.J. Schaffer.

U.S. Patent Application entitled "Verification of Encryption Key", U.S. Appl. No. 11/530,009, filed Sep. 7, 2006, IBM, by inventors P.M. Greco, S. Halevi and G.A. Jaquette.

U.S. Patent Application entitled "Recovering Remnant Encrypted Data on a Removable Storage Media", U.S. Appl. No. 11/530,021, filed Sep. 7, 2006, IBM, by inventors E.M. Dawson, P.M. Greco, G.A. Jaquette, and J.M. Karp.

U.S. Patent Application entitled "Validating an Encryption Key File on Removable Storage Media", U.S. Appl. No. 11/530,019, filed Sep. 7, 2006, IBM, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, IBM, by inventors B.G. Goodman and L.G. Jesionowski.

U.S. Patent Application entitled "Secure Transmission of Cryptographic Key", U.S. Appl. No. 11/530,014, filed Sep. 7, 2006, IBM, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, IBM, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, IBM, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, IBM, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, IBM, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, IBM, by inventors P.M. Greco, S. Halevi, and G.A. Jaquette.

* cited by examiner

| Drive Serial Number (Drive S/N) | World Wide Node Name (WWNN) | Drive Certificate | Certificate Key Identifier | Certificate Key Identifier | ... |
|---|---|---|---|---|---|
| | | | | | |

FIG. 2

AUTOMATICALLY FILLING A DRIVE TABLE

BACKGROUND

1. Field

Embodiments of the invention relate to automatically filling a drive table.

2. Description of the Related Art

Automated data storage libraries (e.g. tape libraries including tape drives) are known for providing cost effective storage and retrieval of large quantities of data. The data in automated data storage libraries is stored on data storage media (e.g. tape cartridges) that are, in turn, stored in storage slots (or storage shelves or the like) inside the library in a fashion that renders the data storage media, and its resident data, accessible for physical retrieval. An accessor may be used to move data storage media (e.g., tape cartridges) between the storage slots and data storage drives (e.g., tape drives). Such data storage media are commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash TM, Smartmedia TM, Memory Stick TM, etc.). or other suitable media. Typically, the data stored in automated data storage libraries is resident on data storage media that is contained within cartridge and referred to as a data storage media cartridge. An example of a data storage media cartridge that is widely employed in automated data storage libraries for data storage is a tape cartridge.

Sometimes data that is written to the data storage media is encrypted and data that is read from the data storage media is to be decrypted. Encryption may be described as the transformation of data into a form, called a ciphertext, using an encryption key the cannot be easily transformed back to the original data without the decryption key. Decryption may be described as the process of transforming the encrypted data back into its original form using a decryption key.

In some conventional systems, a drive table identifies all tape drives, and drive information (e.g. tape drive serial numbers) is entered into the drive table manually, for example, by a system administrator via a Command Line Interface (CLI). That is, an additive CLI command is entered for each tape drive. The additive CLI command specifies a drive identifier or drive name (e.g. a tape drive serial number) as one of the command's parameters. As this manual solution requires a human to enter drive information, the solution is error prone. Additionally, the manual solution is very time consuming when installing a large number of tape drives (e.g. 192 tape drives in a library). Moreover, if the manual solution runs in the foreground, then processes running in the background may have to be stopped and restarted while the drive table is being completed. Entering drive information manually may also be viewed as a usability problem from a customer's perspective.

Also, some drive tables include a tape drive serial number ("Drive S/N"). However, the tape drive's World Wide Node Name (WWNN) may be the one to stay constant in some environments.

Thus, there is a need in the art for automatically filling a drive table, including enabling the drive table to be updated based on a WWNN instead of a Drive S/N.

SUMMARY OF EMBODIMENTS OF THE INVENTION

Provided are a method, computer program product, and system for filling a drive table. A key request including at least one of a drive serial number and a world wide node name is received from a data storage drive. It is determined whether the drive serial number or a world wide node name are in an entry in a drive table. In response to determining that the drive serial number or a world wide node name are not in an entry in a drive table, a new entry is automatically added in the drive table that includes the at least one of a drive serial number and a world wide node name.

BRIEF DESCRIPTION OF THE DRAWINGS

Referring now to the drawings in which like reference numbers represent corresponding parts throughout:

FIG. 2 illustrates an example drive table in accordance with certain embodiments

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
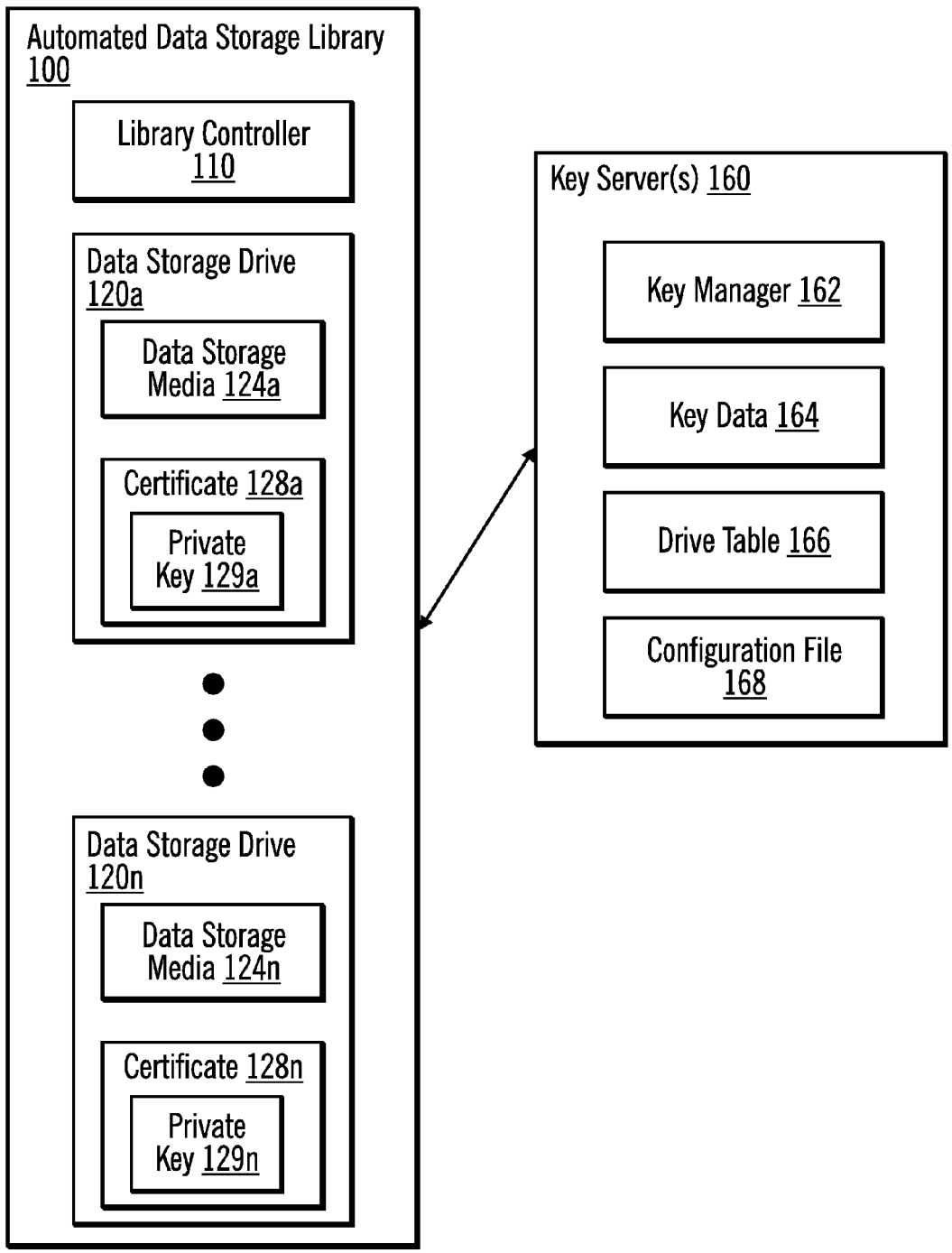
FIG. 1 illustrates details of a computing architecture in accordance with certain embodiments.

FIG. 1 illustrates details of a computing architecture in accordance with certain embodiments. An automated data storage library 100 includes a library controller 110, one or more data storage drives 120a ... 120n (e.g. tape drives), and media inserted into those data storage drives 120a ... 120n, such as data storage media 124a ... 124n. Each data storage drive 120a ... 120n is loaded with data storage media 124a ... 124n (e.g. tape cartridges) and a drive certificate 128a ... 128n (which may also be referred to as a "drive-specific" certificate). It is to be understood that the use of ellipses and suffixes of "a" and "n" after a reference number (e.g. 124a ... 124n) in the diagram indicates that fewer or more elements than those shown may be used without departing from the scope of embodiments. The one or more data storage drives 120a ... 120n enable reading information from and writing information to data storage media 124a ... 124n. Also, the data storage drives are encryption-enabled data storage drives (i.e. they are able to encrypt data that is stored on data storage media 124a ... 124n and decrypt encrypted data that is read from the data storage media 124a ... 124n). In certain embodiments, the data storage drives 120a ... 120n are tape drives that move tape cartridges, as well as enable reading information to and writing information from those tape cartridges. The data storage drives 120a ... 120n may be grouped into one or more data storage drive pools (not shown). For example, the data storage drive pools may be tape drive pools, and each tape drive pool includes a subset of the tape drives in the automated data storage library 100.

The drive certificate 128a ... 128n may be described as a public key certificate that uses a digital signature to bind together a public key with an identity so that the drive certificate 128a ... 128n may be used to verify that the data storage drive possesses the corresponding private key 129a ... 129n.

The automated data storage library 100 is also connected to one or more key servers 160. Although the automated data storage library 100 is illustrated as being directly connected to the one or more key servers 160, the automated data storage library 100 may be connected to proxy servers (not shown) that are connected to the one or more key servers 160. A proxy server may be described as a server that receives requests intended for another computing device (e.g. another server or appliance) and that acts on behalf of the requestor (as the requestors' proxy) to obtain the requested service. In embodiments using proxy servers, the proxy servers may act as proxies for the data storage drives 120a ... 120n and/or data storage drive pools. A proxy server may also be described as a conduit that also acts as a protocol converter and adds other functionality (e.g. Internet Protocol (IP) routing). Thus there may be a proxy server between a key server 160 and a data storage drive 120a ... 120n (or may not), and, if there is, the proxy server acts as a bridge between one type of interface (e.g. Fiber Channel (FC) or RS-422) and another (e.g. IP).

The one or more key servers 160 each include a key manager 162, key data 164, a drive table 166, and a configuration file 168. The key manager 162 assists encryption-enabled data storage drives 120a ... 120n (e.g. tape drives) in generating, protecting, storing, and maintaining encryption keys that are used to encrypt information being written to, and decrypt information being read from, data storage media 124a ... 124n (e.g. tape cartridges). The key manager 162 is capable of serving numerous data storage drives 120a ... 120n, regardless of where those data storage drives 120a ... 120n reside (e.g. in an automated data storage library 100, connected to mainframe systems through various types of channel connections, or installed in other computing systems.)

The key manager 162 processes key generation or key retrieval requests. In particular, when a data storage drive 120a ... 120n is to write encrypted data, the data storage drive 120a ... 120n first requests an encryption key from a key server 160. Upon receipt of the request at the key server 160, the key manager 162 generates an encryption key (e.g. an Advanced Encryption Standard (AES) key) and serves the generated encryption key to the data storage drive 120a ... 120n in two protected forms:

1. As a protected key that is encrypted or wrapped (e.g. using Rivest-Shamir-Adleman (RSA) key pairs). The data storage drive 120a ... 120n writes one or more protected keys to one or more non-volatile areas within the data storage media 124a ... 124n. In certain embodiment, a non-volatile area is a data storage leader (i.e. the front part of a data storage medium 124a ... 124na ... 124n, before the area that user data is stored). In certain embodiments, the protected key may also be referred to as an Externally Encrypted Data Key (EEDK).

2. As a separately encrypted key for secure transfer to and only readable by the data storage drive 120a ... 120n where it is decrypted upon arrival and used to encrypt the data being written to data storage media 124a ... 124n. Once the data storage drive 120a ... 120n encrypts data with this key and is instructed to unload this data storage medium 124a ... 124n, this key is removed from access, usage by or retrieval from the data storage drive 120a ... 120n.

When an encrypted data storage medium 124a ... 124n is to be read, the data storage drive 120a ... 120n sends the protected key read from the data storage medium 124a ... 124n to the key manager 162, along with the request to retrieve the key needed to read the data storage medium 124a ... 124n. The key manager 162 unwraps (decrypts) the wrapped (protected) key to access the secret key and then rewraps (encrypts) this secret key with another key for secure data transfer back to the data storage drive 120a ... 120n (only readable by the data storage drive 120a ... 120n), where the rewrapped key is then unwrapped to access the secret key, which is used to decrypt the data stored on the data storage medium 124a ... 124n. The key manager 162 allows protected keys to be re-encrypted using different keys (e.g. different RSA keys) from the original ones that were used. The key data 164 may be described as a key store of keys used to create (encrypt) or unwrap (decrypt) the protected key. Also, the key data 164 may be described as including version information, an identifier of the proper keys to use in interpreting key data, and the encrypted encryption keys (which are also referred to as protected keys).

The key server 160 serves keys to known entities. Thus, the key server 160 maintains a drive table 166 with a list of known storage media drives 120a ... 120n to which the key server 160 may serve keys.

The configuration file 168 includes an indicator for indicating whether the drive table 166 is to be automatically filled and provides default certificate key identifier values, which are to be used in creating protected keys. In certain embodiments, certificate key identifiers may also be referred to as certificate aliases.

Multiple key servers 160 with key managers 162 may be provided to enable high availability (i.e. if one key server 160 is unavailable, another may be used by a data storage drive 120a ... 120n).

In certain embodiments, the automated data storage library 100 is a tape library that includes tape drives into which tape cartridges may be inserted.

In certain embodiments, a direct key model is implemented. With the direct key model, an application that writes data provides keys to the data storage drives 120a ... 120n in either a wrapped or direct (key only) manner. The application is not shown in FIG. 1, but would be connected to one or more of data storage drives 120a ... 120n.

Embodiments enable automatically updating the drive table 166, without requiring the time-consumptive and error-prone process of having a manual transcription. Also, embodiments enable the key manager 162 to serve keys based on either a Drive S/N or WWNN and to allow the FRU replacement process.

Additionally, with embodiments, a certificate is installed at each storage media drive 120a ... 120n, which may be used to authenticate the storage media drive 120a ... 120n. Also, with embodiments, the storage media drive 120a ... 120n sends both its Drive S/N and WWNN to the key manager 162 with each key request. The key request may be a request to the key manager 162 for a key to encrypt data or may be a request to the key manager 162 to decrypt a protected key for use by the data storage drive 120a ... 120n in decrypting data on data storage media 124a ... 124n.

With embodiments, a data storage drive 120a ... 120n contacts the key manager 162 with a key request to request a key or to have one unwrapped. In some embodiments, the key manager 162 responds to key requests, without initiating contact with data storage drives 120a ... 120n. In alternative embodiments, the key manager 162 may initiate contact with the data storage drives 120a ... 120n.

In certain embodiments, a data storage drive 120a ... 120n is capable of contacting the key manager 162 out-of-band (e.g. via a library proxy server). In other embodiments, a data storage drive 120a ... 120n is capable of contacting the key manager 162 in-band (e.g. on Fiber Channel, at least up to some proxy (e.g. a device driver). Device Drivers and Access Methods (for the z/OS(r) operating system available from International Business Machines (IBM) Corporation) are initiators and do not do polling, so if a command is being sent to the data storage drive 120*a* . . . 120*n* (e.g. a Load, a Write, or a Read), the data storage drive 120*a* . . . 120*n*, as the target device, has the change to respond, otherwise the data storage drive 120*a* . . . 120*n* does cannot establish connection to the key server 160 in-band because it is not able to initiate.

To protect against an attacker connecting to the key server 160 and asking for and getting keys, the key manager 162 uses the drive table 166 to screen key requests to determine whether they are valid key requests or potential attacks. The drive table 166 identifies "known entities" that should be responded to, which are to be distinguishable from other entities.

FIG. 2 illustrates an example drive table 200 in accordance with certain embodiments. The drive table 200 provides an example format for drive table 166. The drive table 200 has rows and columns, with a row for each data storage drive 120*a* . . . 120*n* that is a known entity. The drive table 200 includes columns for a drive serial number (e.g. 12 bytes ASCII), a World Wide Node Name (e.g. 8 bytes binary), a drive certificate, and two certificate key identifiers. The drive table 200 may also include one or more additional columns with additional information (represented by the ellipses).

In certain embodiments the drive serial number and/or the WWNN may be treated as the data storage drive identifier or "drive name". In certain embodiments, it is useful to use the WWNN as the data storage drive identifier as the drive serial number is not retained through a FRU process, while the WWNN is retained through this process. In certain embodiments, it is useful to use the drive serial number as this can be easily located on the back of the data storage drive 120*a* . . . 120*n* and as some operating systems (e.g. z/OS® operating system) do not have access to the WWNN.

In certain embodiments, the key manager 162 does not respond to key requests from data storage drives 120*a* . . . 120*n* with drive identifiers not found in the drive table 200. This is to avoid, for example, a Denial of Service (DoS) attack. The key manager 162 responds to key requests from data storage drives with drive identifiers that are found in the drive table 200.

In certain embodiments, a drive diagnostic is available that causes the data storage drive 120*a* . . . 120*n* to invoke an existing key manager 162 command flow (e.g. a key request to create a new key with default key labels). In certain embodiments, the key request may be sent with a code so that the key manager 162 processes the key request as a No Operation (which has a short timeout (e.g. one minute)). The drive diagnostic may be invoked by the automated data storage library 100 (in Library-managed mode), a Device Driver (DD) (in System-managed mode), or an IBM TotalStorage Tape Diagnostic Tool (ITDT) tool (with an IBM Device Driver) (available from International Business Machines (IBM) Corporation). In the case of the automated data storage library 100, in some embodiments, selection of a control on a Graphical User Interface (GUI) provided by embodiments causes the diagnostic to be simultaneously issued to a certain number (e.g. one or 192) of data storage drives 120*a* . . . 120*n* at a given time. Thus, it is possible that all data storage drives in a logical library (which may include all data storage drives 120*a* . . . 120*n* in the automated data storage library 100 or a subset of them) are issued the diagnostic to contact one or more key managers 162 assigned to that logical library.

Embodiments allow the drive table 166 to be automatically updated to include both the Drive S/N and WWNN, without requiring manual transcription. Embodiments leverage use of the drive certificate as a means of authentication and use the Drive S/N and WWNN being sent from the data storage drives 120*a* . . . 120*n* with each key request.

In certain embodiments, automated entry (automatic filling) of the drive table 166 is enabled when a configuration file 168 option is set and a valid Drive S/N and WWNN are presented with the key request, with the optional additional requirement that the data storage drive 120*a* . . . 120*n* contain an authenticatable drive certificate 128*a* . . . 128*n*.

Data storage drives 120*a* . . . 120*n* that do not have entries in the drive table 166 may be introduced within some period of time (e.g. by having each make a key request, e.g. as part of the install process) or may be added to the drive table 166 whenever they first contact the key manager 162 (i.e. as opportunity allows). In the case in which the data storage drives 120*a* . . . 120*n* that do not have entries in the drive table 166 contact the key manager 162 in a given period of time, the configuration file 168 option may be set for that period of time (i.e. the configuration file 168 option is set temporarily). In the case in which the data storage drives 120*a* . . . 120*n* that do not have entries in the drive table 166 do not contact the key manager 162 in a given window of time, the configuration file 168 option may be left on, at least until the data storage drives 120*a* . . . 120*n* that do not have entries in the drive table 166 are seen to have entries in the drive table 166.

Embodiments add a form of data storage drive discovery to the key server 160. That is, in certain embodiments, the key manager 162 listens for requests emitted from data storage drives 120*a* . . . 120*n*, libraries (e.g. automated data storage library 100), and proxy servers. With embodiments, the key manager 162 is dynamic and "adaptive" to a customer's environment. In particular, with embodiments, the key manager 162 provides a form of "discovery" processing at the key server 160, allowing customers to have their key server 160 used for any data storage drives 120*a* . . . 120*n* in their environment that successfully connect to and communicate with the key server 162.

In certain embodiments, in order to "discover" new data storage drives 120*a* . . . 120*n*, the key manager 162 at the key server 160 employs the following Pseudocode (1):

On the start of each operation request (i.e. key request) from each data storage drive:

```
If [Drive not found in Drive Table] {
    if [Drive Discovery Enabled ] {
        Create New Drive Table Entry:
            driveName = <drive Serial Number and/or WWNN received>
            failedCount = 0
            isValid = false
            numberOfOperationsPerformed = 0
        [AUDIT: new drive discovered, drive Table Entry created]
    } /* Drive Discovery Enabled */
} /* Drive not found */
```

In Pseudocode (1), the determination of "Drive not found in Drive Table" is based on looking up the drive identifier, which may be the drive serial number, in the drive table 166 (e.g. a lookupDriveTableEntry subprocedure fails to return an entry). The determination of "Drive Discovery Is Enabled" is based on a new configuration parameter of accept Unknown-Drives being set to true in the configuration file 168. The following is the format of this new configuration parameter.

```
acceptUnknownDrives = "true" | "false"
    (default: true)
```

Also, in Pseudocode (1), a new drive table entry is created when a data storage drive 120a . . . 120n that has sent an operation request (i.e. a key request) does not have an entry in the drive table 166 and the configuration parameter accept UnknownDrives is set to true (i.e. subprocedure Config:acceptUnknownDrives == "true"). The drive name is set to a unique identifier, such as the Drive S/N and/or WWNN. The failedCount parameter is set to zero because no failed operations have been encountered with this data storage drive 120a . . . 120n. Note that failed operations is another means of verifying proper operation with the data storage drive 120a . . . 120n and can be used to protect against un-wanted or faulty devices from impacting normal operations. If a data storage drive 120a . . . 120n exceeds some failure count, the data storage drive 120a . . . 120n may be dis-avowed of further service requests until some administrative action is taken to reset the data storage drive 120a . . . 120n, the drive table or both. The isValid parameter is set to false as the data storage drive 120a . . . 120n has not been validated (i.e. as a valid data storage drive 120a . . . 120n rather than as an attacker). The numberOfOperationsPerformed is initially set to zero as no operations have been performed for this data storage drive 120a . . . 120n yet.

The default values of the drive table entry may be manually modified (e.g. via a CLI command or GUI).

Pseudocode(1) is performed before the drive certificate verification that enables a data storage drive 120a . . . 120n asking for assistance to be verified as a data storage drive 120a . . . 120n (rather than an attacker) if the verification is enabled.

Merely having an entry in the drive table would not enable a data storage drive 120a . . . 120n to be used for encrypting information since the certificate key identifiers for building protected keys (referred to herein as recAlias1 and recAlias2) are not set yet.

In certain embodiments, the certificate key identifiers are set using an admin CLI "moddrive" command. To alleviate the requirement of having to enter the certificate key identifier values before the data storage drive 120a . . . 120n may be used for encrypting data storage media 124a . . . 124n, embodiments use the following configuration parameters:

```
defaultAlias1 = <alias>
    (default: none)
defaultAlias2 = <alias>
    (default: none) are proposed here.
```

The defaultAlias1 and defaultAlias2 configuration parameters in the configuration file 168 are used in the event that the drive table entry in the drive table 166 is not configured with "recAlias" values.

In certain embodiments, where certificate key identifier values are to be used in building the protected keys, the key manager 162 at the key server 160 employs the following Pseudocode (2):

```
When building or interpreting EEDK[n]:
    if [Drive:recAlias[n] is not set] {
```

-continued

```
        if [Config:defaultAlias[n] is set] {
            recAlias1 = Config:defaultAlias1
        } /* if defaultAlias is set */
        else {
            [AUDIT: NOT ABLE to create EEDK[n] - no receiver specified]
        }
    } /* if Drive:recAlias not set */
```

In Pseudocode (2), the (EEDK) refers to a protected key. "Building" the protected key refers to processing a key request when a data storage drive 120a . . . 120n is to write data and needs and encryption key, while "interpreting" refers to processing a key request when a data storage drive 120a . . . 120n is to read data and needs a protected key unwrapped. Then, with Pseudocode (2), if the recAlias values are not set for the data storage drive 120a . . . 120n in the drive entry of the drive table 166 (i.e. Drive:recAlias[n] is not set), and if default value are set via the configuration parameters defaultAlias1 and defaultAlias2 in the configuration file 168 (i.e. Config:defaultAlias[n] is set), then the default values may be used. Otherwise, an indication that the key manager 162 is not able to create the protected key is returned.

Thus, the key server 160 is able to adapt to whatever existing environment is being used with data storage drives 120a . . . 120n being auto-added to the drive table 166 as they first make contact with the key server 160. This is enabled by the key server 160 listening for requests.

Figure 3A:
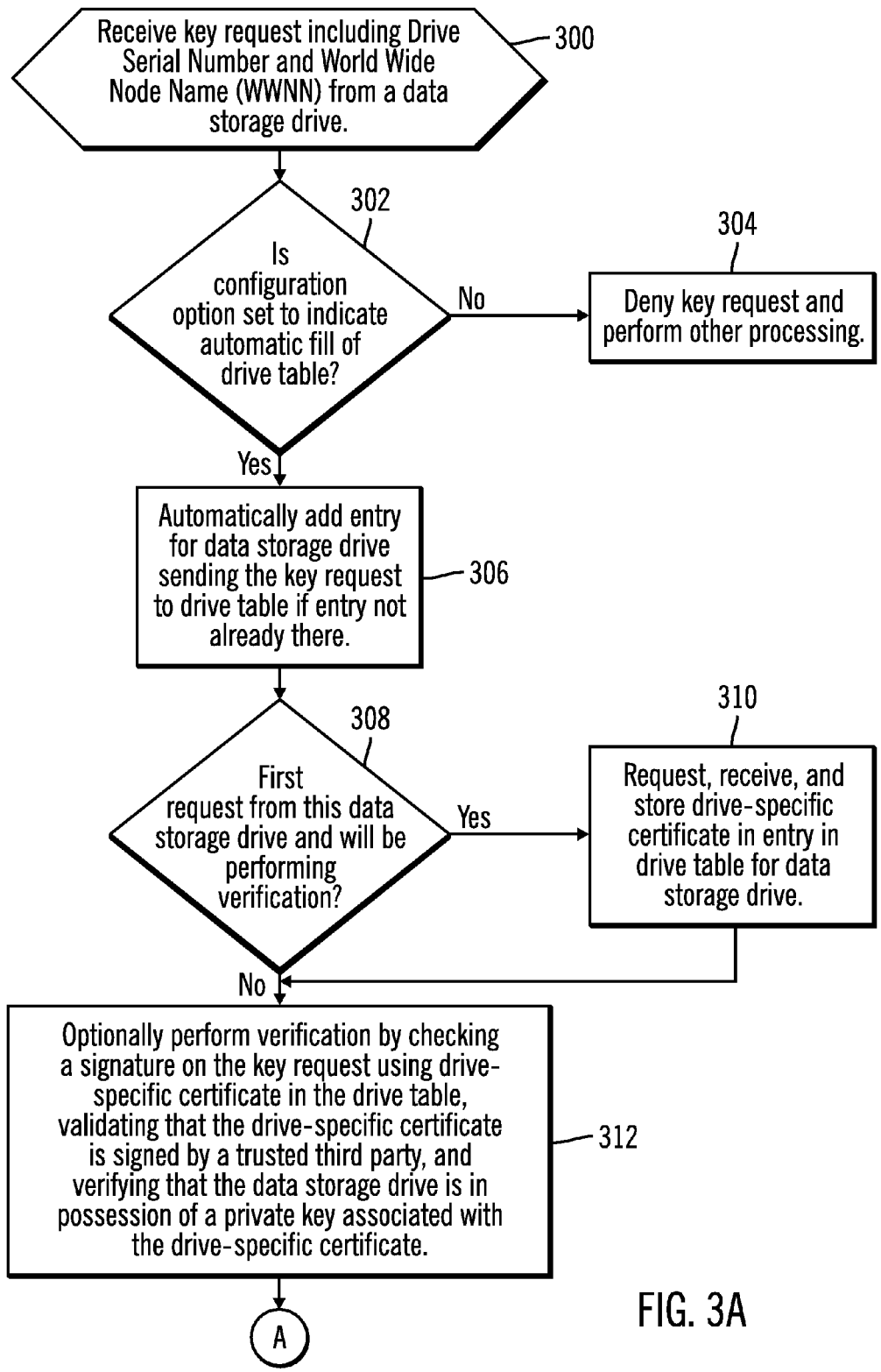
FIGS. 3A and 3B illustrate logic performed by a key manager to automatically fill a drive table in accordance with certain embodiments.
Figure 3B:
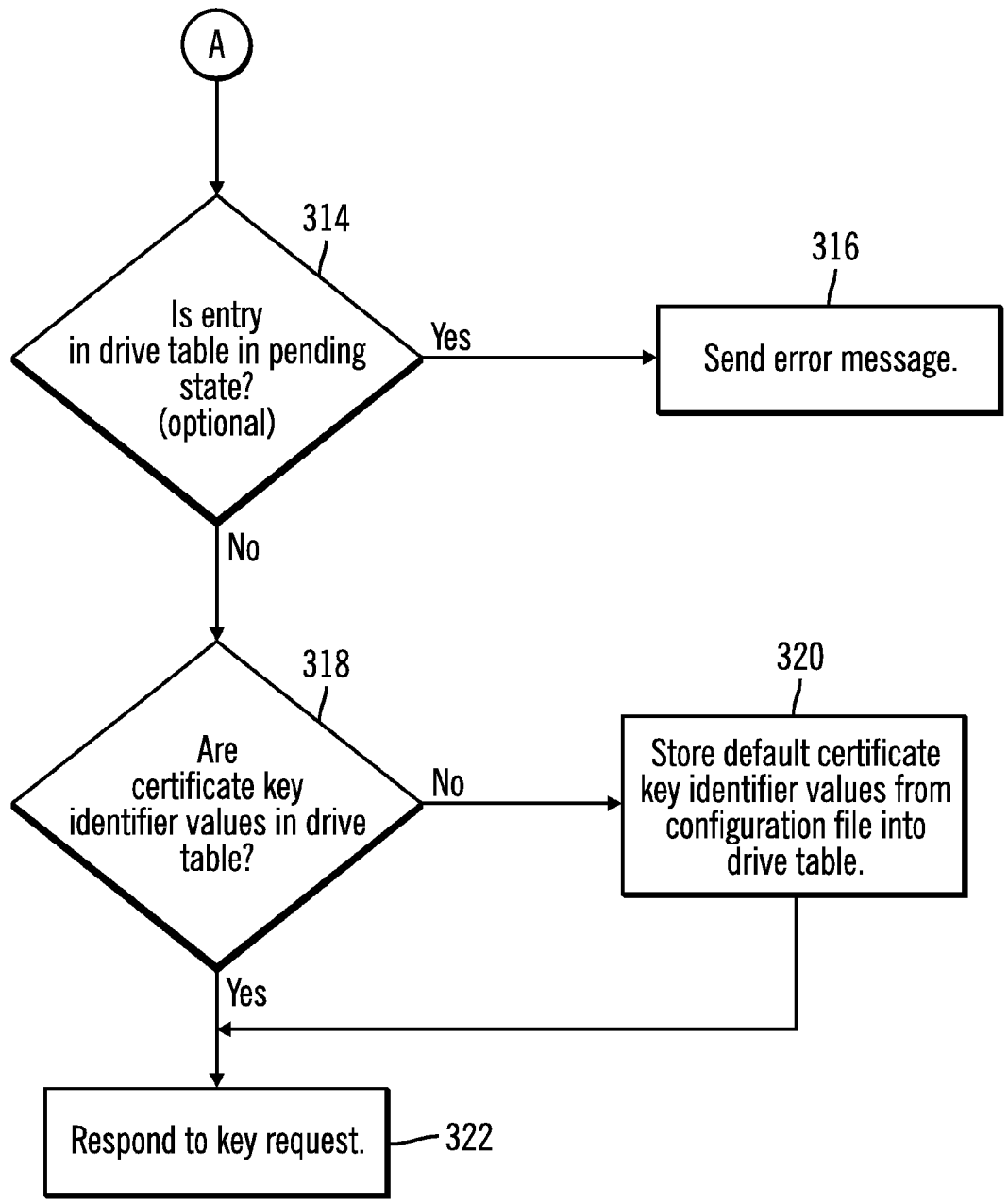

FIGS. 3A and 3B illustrate logic performed by the key manager 162 to automatically fill a drive table 166 in accordance with certain embodiments. Control begins at block 300 (FIG. 3A) with the key manager 162 receiving a key request including the Drive S/N and WWNN from a data storage drive 120a . . . 120n. In block 302, the key manager 162 determines whether a configuration option is set to indicate automatic fill of drive table (e.g. whether an acceptUnknownDrives parameter is set to true in the configuration file 168). If so, processing continues to block 302, otherwise, processing continues to block 304. In block 304, the key request is denied and other processing is performed.

In block 306, the key manager 162 automatically adds an entry (i.e. row) for the data storage drive 120a . . . 120n sending the key request to the drive table 166, if an entry is not already there. In block 308, the key manager 162 determines whether this is the first request from this data storage drive 120a . . . 120n and whether verification (i.e. validation) will be performed. Note that the verification processing is optional in certain embodiments. If so, processing continues to block 310, otherwise, processing continues to block 312.

In block 310, the key manager 162 requests a drive-specific certificate from the data storage drive 120a . . . 120n, receives a valid drive-specific certificate from the data storage drive 120a . . . 120n, and stores the drive-specific certificate in the entry in the drive table 166 for the data storage drive 120a . . . 120n. From block 310, processing continues to block 312.

In block 312, the key manager 162 optionally performs verification checking by checking a signature on the key request using the drive-specific certificate in the drive table 200, validating that the drive-specific certificate is signed by a trusted third party, and verifying that the data storage drive is in possession of a private key 129a . . . 129n associated with the drive-specific certificate. Thus, in certain embodiments, the key manager 162 queries a drive certificate 128a . . . 128n from the data storage drive 120a . . . 120n the first time the data storage drive 120a . . . 120n contacts the key manager

162. If a valid drive certificate 162 is returned by the data storage drive 120a . . . 120n that checks out (i.e. to a root Certificate Authority (CA), which may be described as an entity that issues the drive certificates 128 and is an example of a trusted third party), the key manager 162 validates data storage drive entry in the drive table 200 for that data storage drive 120a . . . 120n. The drive certificate 128a . . . 128n is also stored in the drive table 200. Then, the key manager 162 is capable of checking signatures on key requests against the drive certificate in the drive table 200. In this manner, the key manager 162 is able to verify that a key request is from a data storage drive 120a . . . 120n and not an attacker masquerading as a data storage drive 120a . . . 120n. From block 312 (FIG. 3A), processing continues to block 314 (FIG. 3B).

In block 314 (FIG. 3B), optionally, the key manager 162 determines whether the entry in the drive table 168 for the data storage drive 120a . . . 120n is in a pending state. If so, processing continues to block 316, otherwise, processing continues to block 318. In block 316, the key manager 162 sends an error message. Thus, in certain embodiments, once a drive table entry has been created, a system administrator indicates (e.g. via a CLI command or GUI) whether the key manager 162 should respond to key requests to the data storage drive 120a . . . 120n associated with that entry.

In block 318, the key manager 162 determines whether there are certificate key identifier values in the drive table 168 for the data storage drive 120a . . . 120n. If so, processing continues to block 322, otherwise, processing continues to block 320. In block 320, the key manager 162 stores default certificate key identifier values from the configuration file 168 into the drive table 166. From block 320, processing continues to block 322. In block 322, the key manager 162 responds to the key request.

Although FIGS. 3A and 3B illustrate the logic in accordance with certain embodiments, many variations are within the scope of the embodiments.

With certain embodiments, a configuration file 168 option (or flag) (i.e. acceptUnknownDrives parameter) may be set to indicate to the key manager 162 to not check the drive table 166 for certain elements. For example, if the acceptUnknownDrives parameter is set to true, the key manager 162 may not check or update the drive table 166, and yet allow key requests to be processed. In other embodiments, a new drive table row is created for any data storage drive 120a . . . 120n that does not have an existing drive table row, and key requests are processed for data storage drives 120a . . . 120n that have an existing drive table row in the drive table 166.

In certain embodiments, the key manager 162 responds to a key request from a data storage drive 120a . . . 120n whether or not the data storage drive 120a . . . 120n has a drive entry with a drive identifier (i.e. Drive S/N and/or WNNN) in the drive table 166. That is, the key manager 162 responds to the key request whether or not the drive identifier is in the drive table 166, and, if the drive identifier is not in the drive table 166, the key manager 162 enters the drive identifier for the data storage drive 120a . . . 120n in the drive table 166.

However, there are different forms of responding to the key request. In certain embodiments, there is a "configuration file 168 option—full" response. With the "configuration file 168 option—full" response, the key manager 162 creates a new row in the drive table 166 for each data storage drive 120a . . . 120n that contacts the key server 160 and serves keys to the data storage drive 120a . . . 120n, without verifying certificates. In certain embodiments, there is the "configuration file 168 option—full with valid certificate" response. With the "configuration file 168 option—full with valid certificate" response, the key manager 162 creates a new row in the drive table 166 for each data storage drive 120a . . . 120n that contacts the key server 160 and serves keys to the data storage drive 120a . . . 120n, with verification of certificates. Thus, if a key request sender establishes connectivity, knows the protocol, presents at least one certificate, and proves that it has possession of its corresponding private key, then the key request sender is able to get keys. In certain embodiments, there is a "configuration file 168 option—full with valid certificate and within a range" response. With the "configuration file 168 option—full with valid certificate and within a range" response, the key manager 162 creates a new row in the drive table 166 for each data storage drive 120a . . . 120n that contacts the key server 160 and serves keys to the data storage drive 120a . . . 120n, with verification of certificates, within a range (e.g. a communications protocol endpoint address range). Ranging may be via a row in the drive table 166 that is not used for information on any given data storage drive 120a . . . 120n (e.g. for certificates), but that sets effectively a policy on what criterion is to be met for a data storage drive 120a . . . 120n to be added to the drive table 166.

Various ranging techniques may be used in different embodiments. In certain embodiments, a Drive S/N range is used. That is, wild cards may be used to specify which set of data storage drives 120a . . . 120n to accept. If a key request sender establishes connectivity, knows the protocol, presents a certificate from a data storage drive 120a . . . 120n in the Drive S/N range, and proves that it has possession of its corresponding private key, then the key request sender is able to get keys. In certain embodiments, the Drive S/N range may be closely constrained. That is, when a range is specified, embodiments are more precise in which data storage drives 120a . . . 120n are allowed to get keys. By allowing wildcards or even a "regular expression", then complex matches on what is and is not allowed in may be defined. In certain embodiments, to allow FRU replacements without having key server 160 problems, the Drive S/N range may be very wide. In certain other embodiments, a WWNN range is used. That is, wild cards are in a drive table row in the WWNN column. In certain embodiments, the WWNN range may be may be tightly specified (i.e. more so than a Drive S/N range). For example, all 192 drives in a given library may fall within a range of 256 WWNN values, and, thus, there may be at most two wild cards in a 16 byte WWNN range specification.

With reference to different forms of responding to the key request, in certain embodiments, there is a "configuration file 168 option—partial" response. With the "configuration file 168 option—partial" response, the key manager 160 enters a new row in the drive table 166 in pending status, which means that the key manager 162 does not serve any keys until the data storage drive 120a . . . 120n is accepted (i.e. indicated as "to be accepted" with a system administrator via a CLI command or GUI). The key manager 162 sends an error response to the data storage drive 120a . . . 120n indicating that the data storage drive status is pending. As an example of a CLI command, a certain number (e.g. 192 pending data storage drives) may be accepted with a single CLI command. This provides security because an attacker may get at most a pending entry into the drive table 166.

In certain embodiments, there is a "configuration file 168 option—error" response. With the "configuration file 168 option—error" response, the key manager 162 responds with an error message and does not change the drive table 166.

As an alternative to the configuration file 168 option, there is an "edge" option. With the edge option, when installing the data storage drives, certain embodiments cause some edge (i.e. something that causes a key request to be issued) that sends to each data storage drive 120a . . . 120n (of a logical library) a diagnostic that attempts to connect to the key server 160. That is, with the configuration file 168 option, the data storage drive 120a . . . 120n contacts the key server 160 to obtain a keys, and so entry into the drive table is "as needed" from the point of view of the data storage drive 120a . . . 120n, and the key server 160 has some flag or polity that allowed success.

With the edge option, the data storage drives 120a . . . 120n are caused to contact the key server 160 and, thus, to be entered, or made pending, in the drive table 166. In certain embodiments, this allows success within a window of time (e.g. Customer Engineer (a filed service person) call). In certain embodiments, a system administrator who is physically present causes the edge (e.g. via a command entered on a drive operator panel), which provides a great deal of security as physical access to the data storage drives 120a . . . 120n is needed. In certain embodiments, the edge may be caused remotely (e.g. via a GUI), so that no physical access to the data storage drives is needed to cause the edge. In certain other embodiments, a routine calls out each data storage drive 120a . . . 120n in a logical library, one after another, (either serially or in some other order, but a serial order is not necessary, e.g. a diagnostic may be sent to a next data storage drive 120a . . . 120n on a list without waiting for the data storage drive 120a . . . 120 *n* before it to succeed/fail).

With the edge option, the key manager 162 does not respond to key requests from a data storage drive 120a . . . 120n if the data storage drive 120a . . . 120n is not in the drive table 166, with failure (after a short timeout (e.g. one minute)). Since both Drive S/N and WWNN are sent by the data storage drive 120a . . . 120n with a key request, in environments in which a diagnostic is sent to the data storage drive 120a . . . 120n, the data storage drive 120a . . . 120n is connected to the key server 160, and the data storage drive 120a . . . 120n issues a key request to the key server 160, the key manager 162 is presented with the Drive S/N and WWNN electronically. To capture this information, the key manager 162 creates a new row in the drive table 166.

With the edge option, the key manager 162 responds to a key request from a data storage drive 120a . . . 120n whether or not the data storage drive 120a . . . 120n has a drive entry with a drive identifier (i.e. Drive S/N and/or WNNN) in the drive table 166. That is, the key manager 162 responds to the key request whether or not the drive identifier is in the drive table 166, and, if the drive identifier is not in the drive table 166, the key manager 162 enters the drive identifier for the data storage drive 120a . . . 120n in the drive table 166. However, there are different forms of responding to the key request.

In certain embodiments, there is an "edge option—full" response. With the "edge option—full" response, the key manager 162 creates a new row in the drive table 166 for each data storage drive 120a . . . 120n that contacts the key server 160 and serves keys to the data storage drive 120a . . . 120n, without verifying certificates. In certain embodiments, there is the "edge option—full with valid certificate" response. With the "edge option—full with valid certificate" response, the key manager 162 creates a new row in the drive table 166 for each data storage drive 120a . . . 120n that contacts the key server 160 and serves keys to the data storage drive 120a . . . 120n, with verification of certificates. Thus, if a key request sender established connectivity, knows the protocol, presents at least one certificate, and proves that it has possession of its corresponding private key, then the key request sender is able to get keys.

In certain embodiments, there is an "edge option—full with valid certificate and within a range" response. With the "edge option—full with valid certificate and within a range" response, the key manager 162 creates a new row in the drive table 166 for each data storage drive 120a . . . 120n that contacts the key server 160 and serves keys to the data storage drive 120a . . . 120n, with verification of certificates, "within a range" (e.g. a communications protocol endpoint address range). Ranging may be via a row in the drive table 166 that is not used for information on any given data storage drive 120a . . . 120n (e.g. for certificates), but that sets effectively a policy on what criterion is to be met for a data storage drive 120a . . . 120n to be added to the drive table 166.

In certain embodiments, the range is established immediately before the diagnostic is sent and removed immediately afterwards. The "edge option—full with valid certificate and within a range" response makes it easier and quicker to grant key access to a large number of data storage drives 120a . . . 120n. In certain embodiments, the range may indicate the set of data storage drives 120a . . . 120n that are to be added to the drive table 166, as fully valid rows. Thus, ranging may take the place of the acceptUnknownDrives parameter, with the range representing that for data storage drives 120a . . . 120n in the range, the key manager 162 does not check the data storage drives 120a . . . 120n, but, instead, trusts these data storage drives 120a . . . 120n and adds them to the drive table 166. In certain alternative embodiments, the range may be used to qualify which data storage drives 120a . . . 120n are added as pending rows and/or which are added as accepted rows. This pending row technique may be helpful in an environment in which attacks may occur during installation.

With reference to different forms of responding to the key request, in certain embodiments, there is an "edge option—partial" response. With the "edge option—partial" response, the key manager 160 enters a new row in the drive table 166 in pending status, which means that the key manager 162 does not serve any keys until the data storage drive 120a . . . 120n is accepted (i.e. by a system administrator via a CLI command or GUI). The key manager 162 sends an error response to the data storage drive 120a . . . 120n indicating that the data storage drive status is pending. Thus, with the edge option and the "edge option—partial" response, embodiments provide a diagnostic by which the data storage drives 120a . . . 120n in some environment are caused to establish connectivity to the key server 160. As an example of a CLI command, a certain number (e.g. 192 pending data storage drives) may be accepted with a single CLI command. This provides security because an attacker may get at most a pending entry into the drive table 166.

In certain embodiments, there is an "edge option—error" response. With the "edge option—error" response, the key manager 162 responds with an error message and does not change the drive table 166. In such embodiments, an error response flag may be statically set, if desired, to allow ease of attachment, or not set to prevent a DoS attack.

In certain embodiments, there is an "edge option—API" response. An Application Programming Interface (API) is provided by these embodiments, "edge option—API" response, the same application that is issuing the diagnostics is able to communicate with the key server 160 and cause the key manager 162 to add entries for data storage drives 120a . . . 120n to the drive table 166 (e.g. before send the diagnostic to the data storage drive 120a . . . 120n).

As an alternative to the configuration file 168 option and the "edge" option, there is a "drive discovery" option. With the "drive discovery" option, there are existing applications, such as Tivoli Productivity Center (TPC) available from International Business Machines (IBM) Corporation, that already do drive discovery. Embodiments interface the drive discovery applications to the key server 160 via an API, and any discovered drives may be added to the drive table 166.

Thus, in certain embodiments, if a configuration file 168 parameter (e.g. acceptUnknownDrives) is set to true, the key manager 162, upon receiving a key request, adds a drive table row for any data storage drive 120a . . . 120n that connects to the key server 160 and is not already in the drive table 166. Additionally, the key manager 162 requests the data storage drive 120a . . . 120n to present a valid certificate at that time (i.e. the first time the data storage drive 120a . . . 120n contacts the key server 160). Thus, the data storage drive 120a . . . 120n, even though not in the drive table 168 at the time of making the key request, receives a response from the key manager 162. In certain embodiments, a trigger causes a diagnostic be sent to each data storage drive 120a . . . 120n.

In certain other embodiments, the key manager 162 supports the concept of pending drive table entries. In such embodiments, the key manager 162 adds any data storage drive 162 that connects to the key server 160 and is not already in the drive table 166 as pending. The key manager 162 does not provide keys to the data storage drive 120a . . . 120n until data storage drive 120a . . . 120n has been accepted (e.g. the pending state has been changed to "to be accepted").

In yet other embodiments, the key manager supports a CLI extension that allows a user to list, accept, or clear pending drive table entries. Accepting a pending drive table entry means that the next time the key manager 162 is contacted by the data storage drive 120a . . . 120n with the accepted entry, the key manager 162 will respond to the data storage drive 120a . . . 120n and query the certificate. In certain embodiments, the key manager 162 does not serve keys to the data storage drive 120a . . . 120n with the accepted entry until the certificate is verified.

In further embodiments, if a configuration file 168 parameter (e.g. acceptUnknownDrives) is set to false, the key manager 162 responds to key requests from data storage drives not in the drive table 168 with an error message.

In certain embodiments, the key manager 162 supports the concept of pending drive table entries along with a CLI extension that allows a user to list, accept, or clear pending drive table entries. This provides security, while reducing the amount of CLI work. With such embodiments, the key manager 162 may respond to data storage drive 120a . . . 120n queries (e.g. with a request for a drive certificate) or, alternatively, may not respond to the data storage drive 120a . . . 120n queries while the state is pending. Data storage drives 120a . . . 120n that do not have entries in the drive table 166 may be introduced within some period of time (e.g. by having each make a key request, e.g. as part of the install process) or may be added to the drive table 166 whenever they first contact the key manager 162 (i.e. as opportunity allows).

Embodiments provide a technique for automatically filling the drive table 120, while still allowing for administrator authorization to optionally be required before the data storage drives 120a . . . 120n corresponding to those automatically filled drive entries are able to get keys, and hence provide a means for security.

z/OS is a registered trademark or common law mark of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g. hard disk drives, floppy disks, tape, etc.), volatile and non-volatile memory devices (e.g. a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g. an integrated circuit chip, Programmable Gate Array (PGA). Application Specific Integrated Circuit (ASIC), etc.). Still further, the code implementing the described operations may be implemented in "transmission signals", where transmission signals may propagate through space or through transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3A and 3B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic of in some combination of hardware, software, or gate array logic.

Figure 4:
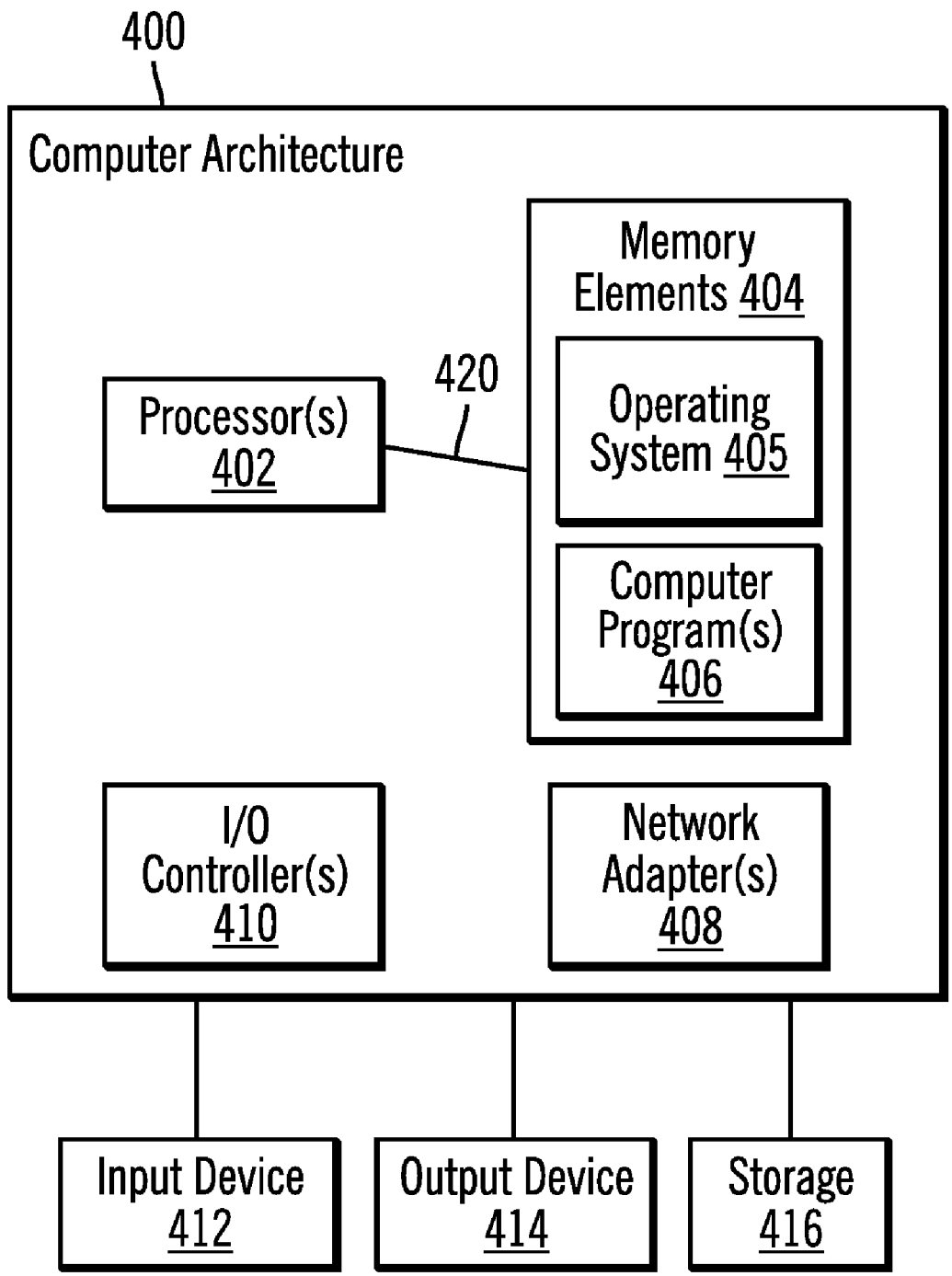
FIG. 4 illustrates a system architecture that may be used in accordance with certain embodiments.

FIG. 4 illustrates a system architecture 400 that may be used in accordance with certain embodiments. Automated data storage library 100 and/or one or more key servers 160 may implement system architecture 400. The system architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The system architecture 400 may be coupled to storage 416 (e.g. a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The system architecture 400 may include fewer components than illustrated, additional components not illustrated herein, or some combination of the components illustrated and additional components. The system architecture 400 may comprise any computing device known in the art, such as a mainframe, server, personal computer, workstation, laptop, handheld computer, telephony device, appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for filling a drive table, comprising:
   receiving a key request including at least one of a drive serial number and a world wide node name from a data storage drive in a data storage library;
   determining whether the drive serial number or the world wide node name are in an entry in a drive table, wherein the drive table includes an entry for each data storage drive that is a known entity, and wherein the entry includes a drive-specific certificate and certificate key identifiers; and
   in response to determining that the drive serial number or a world wide node name are not in an entry in a drive table, automatically adding a new entry in the drive table that includes the at least one of the drive serial number and the world wide node name.

2. The method of claim 1, further comprising:
   determining whether this is a first key request received from the data storage drive and whether verification is to be performed; and
   in response to determining that this is the first key request from the data storage drive and that verification is to be performed,
     requesting a drive-specific certificate from the data storage drive;
     receiving a valid drive-specific certificate from the data storage drive; and
     storing the drive-specific certificate in the entry in the drive table for the data storage drive.

3. The method of claim 2, further comprising:
   performing verification by checking a signature on the key request using the drive-specific certificate in the drive table, validating that the drive-specific certificate is signed by a trusted third party, and verifying that the data storage drive is in possession of a private key associated with the drive-specific certificate.

4. The method of claim 1, further comprising:
   determining whether the entry in the drive table for the data storage drive is in a pending state;
   in response to determining that the entry in the drive table for the data storage drive is in the pending state, sending an error message; and
   in response to determining that the entry in the drive table for the data storage drive is not in the pending state, responding to the key request.

5. The method of claim 1, further comprising:
   determining whether a configuration option is set to indicate that there should be automatic fill of the drive table.

6. The method of claim 1, further comprising:
   determining whether there are certificate key identifier values in the drive table for the data storage drive; and
   in response to determining that there are no certificate key identifier values in the drive table for the data storage drive, storing default certificate key identifier values from a configuration file into the drive table.

7. The method of claim 6, further comprising:
   responding to the key request.

8. A computer program product comprising a tangible computer storage medium including a computer readable program, wherein the computer readable program when executed on a computer causes the computer to:
   receive a key request including at least one of a drive serial number and a world wide node name from a data storage drive in a data storage library;
   determine whether the drive serial number or the world wide node name are in an entry in a drive table, wherein the drive table includes an entry for each data storage drive that is a known entity, and wherein the entry includes a drive-specific certificate and certificate key identifiers; and in response to determining that the drive serial number or a world wide node name are not in an entry in a drive table, automatically add a new entry in the drive table that includes the at least one of the drive serial number and the world wide node name.

9. The computer program product of claim 8, wherein the computer readable program when executed on a computer causes the computer to:

determine whether this is a first key request received from the data storage drive and whether verification is to be performed; and in response to determining that this is the first key request from the data storage drive and that verification is to be performed, request a drive-specific certificate from the data storage drive;

receive a valid drive-specific certificate from the data storage drive; and store the drive-specific certificate in the entry in the drive table for the data storage drive.

10. The computer program product of claim 9, wherein the computer readable program when executed on a computer causes the computer to:

perform verification by checking a signature on the key request using the drive-specific certificate in the drive table, validating that the drive-specific certificate is signed by a trusted third party, and verifying that the data storage drive is in possession of a private key associated with the drive-specific certificate.

11. The computer program product of claim 8, wherein the computer readable program when executed on a computer causes the computer to:

determine whether the entry in the drive table for the data storage drive is in a pending state;

in response to determining that the entry in the drive table for the data storage drive is in the pending state, send an error message; and in response to determining that the entry in the drive table for the data storage drive is not in the pending state, respond to the key request.

12. The computer program product of claim 8, wherein the computer readable program when executed on a computer causes the computer to:

determine whether a configuration option is set to indicate that there should be automatic fill of the drive table.

13. The computer program product of claim 8, wherein the computer readable program when executed on a computer causes the computer to:

determine whether there are certificate key identifier values in the drive table for the data storage drive; and in response to determining that there are no certificate key identifier values in the drive table for the data storage drive, store default certificate key identifier values from a configuration file into the drive table.

14. The computer program product of claim 13, wherein the computer readable program when executed on a computer causes the computer to:

respond to the key request.

15. A system for filling a drive table, comprising:

a key server including hardware logic performing operations, the operations comprising:

receiving a key request including at least one of a drive serial number and a world wide node name from a data storage drive in a data storage library;

determining whether the drive serial number or the world wide node name are in an entry in a drive table, wherein the drive table includes an entry for each data storage drive that is a known entity, and wherein the entry includes a drive-specific certificate and certificate key identifiers; and in response to determining that the drive serial number or a world wide node name are not in an entry in a drive table, automatically adding a new entry in the drive table that includes the at least one of the drive serial number and the world wide node name.

16. The system of claim 15, further comprising:

determining whether this is a first key request from the data storage drive and whether verification is to be performed; and in response to determining that this is the first key request received from the data storage drive and that verification is to be performed, requesting a drive-specific certificate from the data storage drive;

receiving a valid drive-specific certificate from the data storage drive; and storing the drive-specific certificate in the entry in the drive table for the data storage drive.

17. The system of claim 16, further comprising:

performing verification by checking a signature on the key request using the drive-specific certificate in the drive table, validating that the drive-specific certificate is signed by a trusted third party, and verifying that the data storage drive is in possession of a private key associated with the drive-specific certificate.

18. The system of claim 15, further comprising:

determining whether the entry in the drive table for the data storage drive is in a pending state;

in response to determining that the entry in the drive table for the data storage drive is in the pending state, sending an error message; and in response to determining that the entry in the drive table for the data storage drive is not in the pending state, responding to the key request.

19. The system of claim 15, further comprising:

determining whether a configuration option is set to indicate that there should be automatic fill of the drive table.

20. The system of claim 15, further comprising:

determining whether there are certificate key identifier values in the drive table for the data storage drive; and in response to determining that there are no certificate key identifier values in the drive table for the data storage drive, storing default certificate key identifier values from a configuration file into the drive table.

21. The system of claim 20, further comprising:

responding to the key request.

22. The system of claim 15, wherein the key server is coupled to a tape library including at least one tape drive and wherein the data storage drive comprises a tape drive in the tape library.

* * * * *